United States Patent [19]

Hein et al.

[11] Patent Number: 4,827,597
[45] Date of Patent: May 9, 1989

[54] METHOD OF FORMING MAGNETIC TOP WEDGE

[75] Inventors: Bruce Hein, Muskego, Wis.; Charles Shufflebarger, Goodland, Ind.

[73] Assignee: MagneTek, Inc., Los Angeles, Calif.

[21] Appl. No.: 194,078

[22] Filed: May 13, 1988

Related U.S. Application Data

[62] Division of Ser. No. 63,264, Jun. 17, 1987, Pat. No. 4,761,580.

[51] Int. Cl.⁴ .................................... H02K 15/02
[52] U.S. Cl. ........................... 29/596; 29/433; 29/609; 310/214
[58] Field of Search ............ 29/596, 598, 609, 433; 310/42, 214, 216

[56] References Cited

U.S. PATENT DOCUMENTS 3,009,073 11/1961 Drabik et al. .
3,437,858 4/1969 White .
3,780,325 12/1973 Frankenhauser .
4,413,405 11/1983 Doke et al. .
4,425,521 1/1984 Rosenberry, Jr. et al. .
4,427,920 1/1984 Richter et al. .
4,443,725 4/1984 Derderian et al. .
4,701,648 10/1987 Haditsch .

FOREIGN PATENT DOCUMENTS 523047 4/1931 Fed. Rep. of Germany .
556266 6/1923 France .
721516 3/1932 France .
1190819 4/1959 France .
54-113806 5/1979 Japan .
609179 5/1978 U.S.S.R. .
169482 9/1921 United Kingdom .

OTHER PUBLICATIONS

Technical Data Sheet-Polybac No. 304-Steel Filled Trowel Mix undated.
Magnetic Slot Wedges-Micafil A. G. Zurich Schweitz undated.

*Primary Examiner*—Carl E. Hall
*Attorney, Agent, or Firm*—Faegre & Benson

[57] ABSTRACT

A magnetic top wedge for dynamoelectric machinery core slots having laminated ferromagnetic segments aligned by an eccentric aperture and enclosed in an electrically insulating and spacing carrier.

10 Claims, 3 Drawing Sheets

METHOD OF FORMING MAGNETIC TOP WEDGE

CROSS REFERENCE TO RELATED APPLICATIONS

This is a division of application Ser. No. 07/063,264 filed June 17, 1987, now U.S. Pat. No. 4,761,580.

BACKGROUND OF THE INVENTION

In the past, it had been found desirable to build motors using semi-closed slots 10 (see FIG. 1) in stator laminations 12 to improve motor Performance. This necessarily resulted in increased difficulty in manufacturing motors, particularly in inserting windings into the stator slots because of the reduced accessibility of the slot with a semi-closed entry. One solution was to provide for fully open slots, with greater ease of coil insertion which permitted form wound coils 14 (see FIG. 2) but resulted in a reduction in motor performance when used with top wedges 18 without magnetic properties.

Various efforts have been undertaken t provide magnetic slot wedges with wire or iron powder or filings imbedded in a carrier. Each of these approaches has, however, failed to approach the performance obtainable with a semi-closed slot design.

More recently, efforts have been undertaken to provide magnetic wedges formed of laminated magnetic material with the wedge laminations directly abutting stator laminations in the slot as exemplified by U.S. Pat. No. 4,425,521 for a magnetic slot wedge with low average permeability and high mechanical strength. Such an approach, however, suffers from the disability that stator laminations may be short circuited at the stator-wedge interface when the wedge laminations are offset from the stator laminations as may readily occur in practice. Such short circuits at the stator-wedge interface will permit eddy currents with the consequent energy loss and interference with the magnetic fields in this region.

In addition to the above, prior art structures have required handling of the individual laminations to get them into alignment to form a wedge, resulting in relatively high manufacturing expense.

The present invention overcomes the shortcomings of the prior art by providing for a magnetic slot wedge having insulation of Predetermined thickness between the wedge laminations and the stator laminations. Additionally, means are provided for aligning wedge laminations in a simple and efficient manner, thus reducing manufacturing costs.

DETAILED DESCRIPTION

Figure 3:
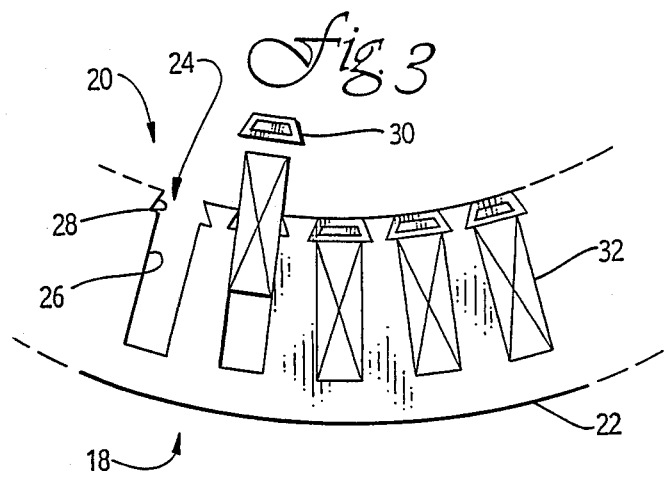
FIG. 3 shows an embodiment of the present invention useful in connection with form wound coils in fully open slots.

Referring now more particularly to FIG. 3, a portion of a dynamo electric machine 18 may be seen having a core structure 20 made up of a plurality of laminations 22 each having a plurality of slots 24. Each slot 24 has walls 26 and has a keyed configuration 28 to receive a wedge 30 to retain a coil 32 in the slot.

Figure 4:
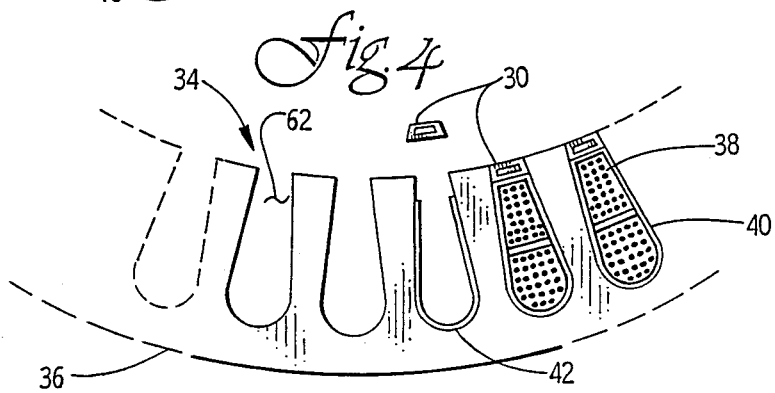
FIG. 4 shows an embodiment of the present invention.
Figure 5:
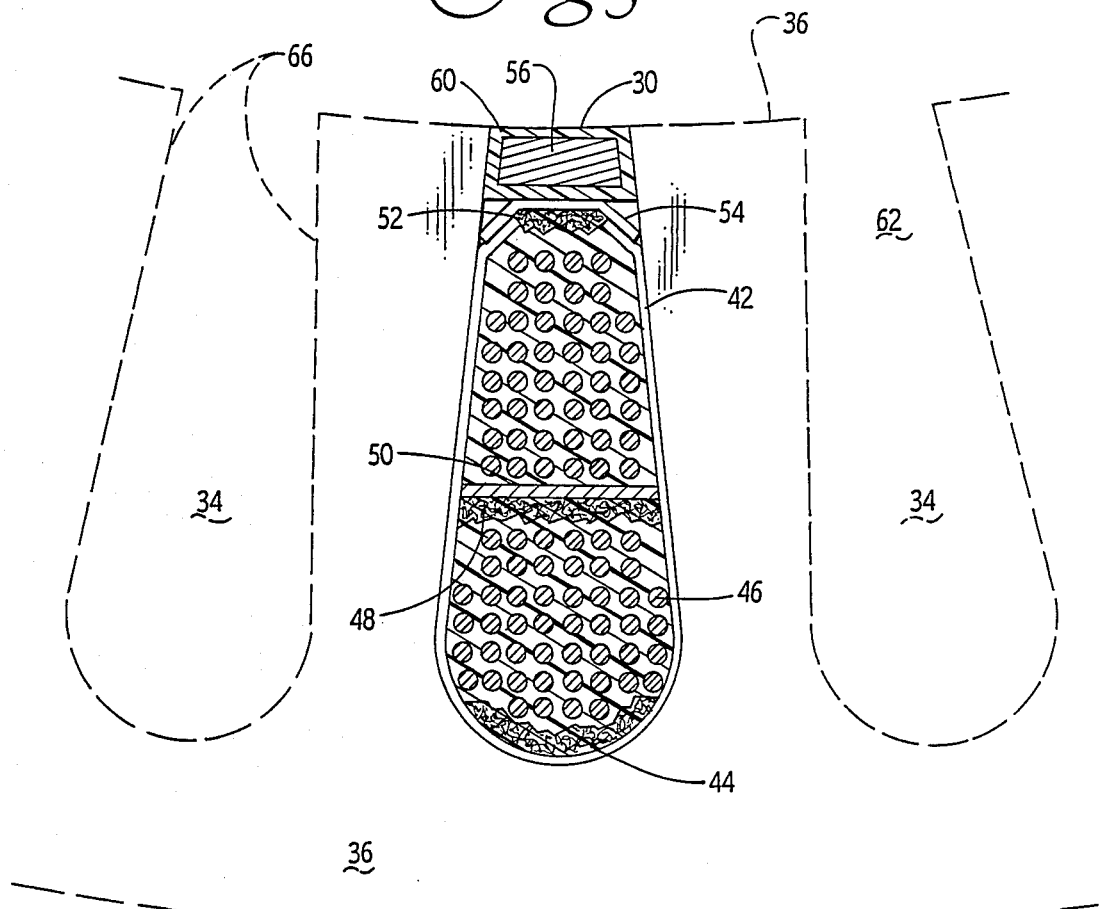
FIG. 5 shows the embodiment of FIG. 4 in more detail.

Referring now also to FIG. 4 and 5, tapered wall slots 34 may be formed in core 36. Coils 38, 40 may be random wound. Coils 38 and 40 are insulated from core 36 as follows. A slot cell layer of insulation 42 is inserted into slot 34. A filler material 44 preferably of a material receptive to resin impregnation forms a bottom filler 44. Magnet wires 46 are inserted into slot 34 to form coil 40. A center filler 48 and center wedge 50 are placed over coil 40 to separate coil 40 from coil 38. A top filler 52 and top U-wedge 54 are placed over coil 38. Coils 38 and 40 are preferably vacuum pressure impregnated with an appropriate insulating resin which also impregnates the filler material 44. The magnetic top wedge 30 is placed over this assembly at the entrance to slot 34. Alternatively, wedge 30 may be placed at the entrance to slot 24, if form wound coils are desired to be utilized.

Figure 6:
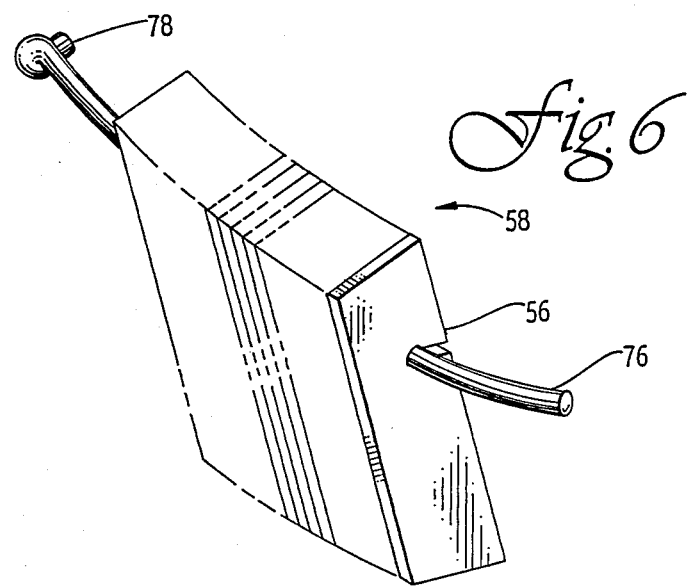
FIG. 6 shows a further feature of the present invention as being a filament running through the magnetic laminations to enable alignment of the laminations.
Figure 7:
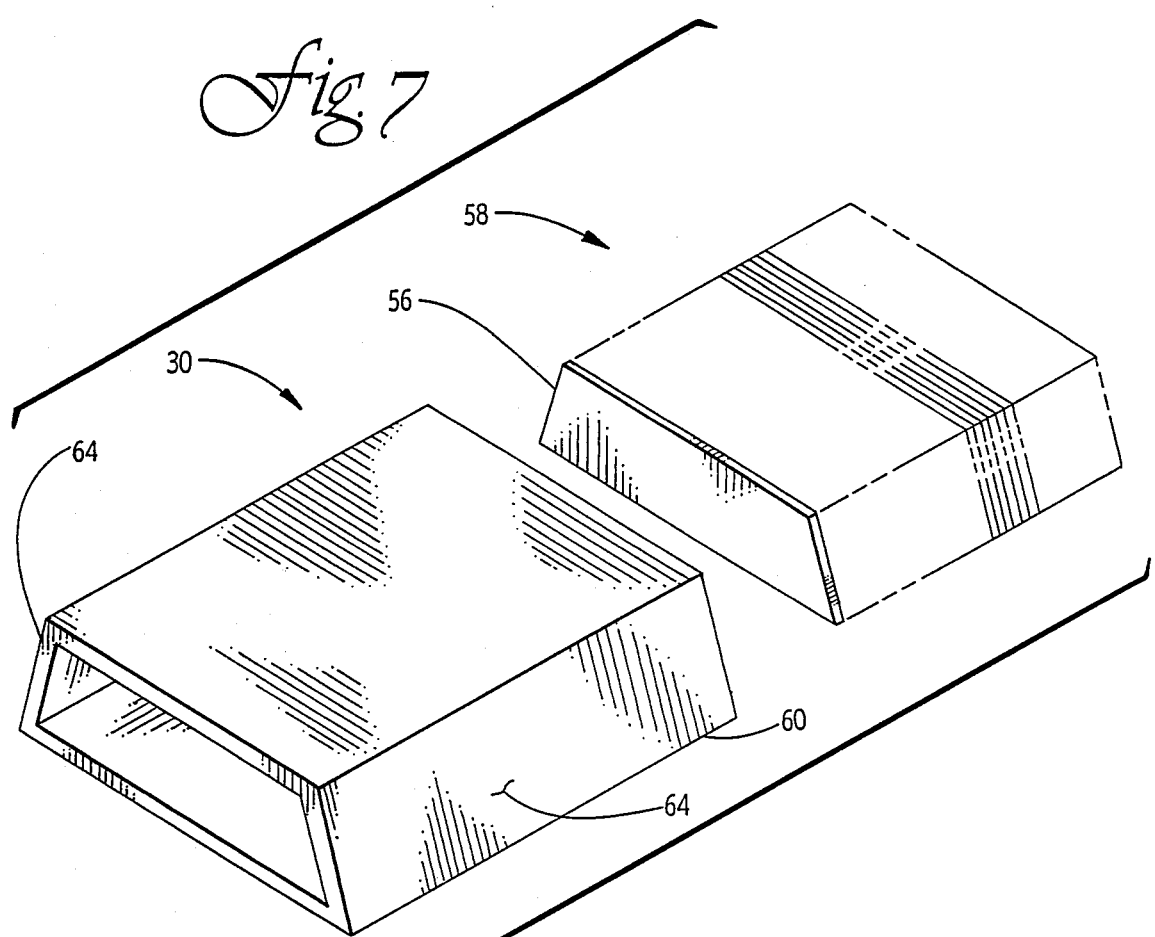
FIG. 7 shows an exploded view of the aligned laminations and insulating carrier.
Figure 8:
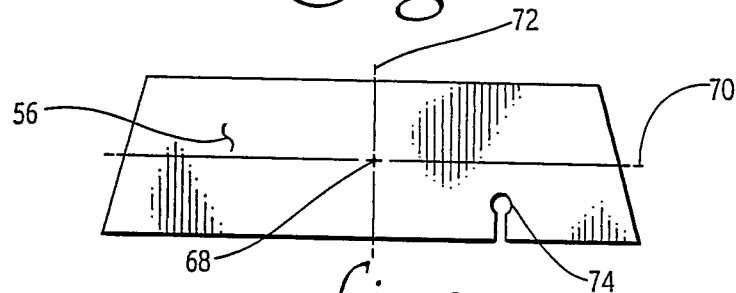
FIG. 8 shows a plan view of one embodiment of the laminations of the present invention.

Referring now to FIGS. 6, 7 and 8, the structure and assembly of the magnetic top wedge is as follows. When it is desired to have a trapezoidal Prism-shaped top wedge, a plurality of ferromagnetic laminations 56 are formed into a stack 58. Stack 58 is contained within an insulating carrier 60 which may be a hollow extruded plastic channel, for example. Channel or carrier 60 may be sealed at each end by conventional means, such as heat staking. Alternatively, stack 58 may be encapsulated in a plastic or epoxy supporting and enclosing stack 58 in a final shape 60 suitable for insertion into the entry of core slot 34. Lamination 56 forms an extension of the magnetic path across the entry 62 of slot 34. Lamination 56 is insulated from core 36 by carrier 60. Carrier 60 is preferably formed of a plastic such as Union Carbide Polysulfone P1720NT13or Dupont Rynite FR530, however, any material compatible with the manufacturing and operating environment of the machinery in which wedge 30 is to be used may be selected. In the design illustrated in FIG. 5, laminations 56 provide an extension of the magnetic path across the slot opening 62, while at the same time providing for a magnetic gap of predetermined length, preferably equal to two times the thickness of insulating layer 64 which is interposed between each side of the stack 58 and the wall 66 of the slot opening 62. It is to be understood that the magnetic gap formed by layers 64 Preferably corresponds to gap 10 in semi-closed slot 8.

Referring now more particularly to FIG. 8, lamination 56 will have a center of gravity 68 located by intersecting axis 70, 72. Lamination 58 is further formed to include a notch or opening 74, preferably formed as a keyhole slot. Opening 74 is located in lamination 56 spaced apart from center of gravity 68.

Referring now to FIG. 6, a plurality of laminations 56 are threaded onto a filament 76 which may have a deformed or enlarged end 78. Laminations 56 are threaded onto filament 76 by way of notch 74, which in this embodiment is in the form of a keyhole opening. When the plurality of laminations 56 are supported by filament 76, which may be a wire or a non-metallic member, laminations 56 will form into a congruent stack 58 due to the action of gravity. Once filaments 56 are formed into such a congruent stack, they may be inserted into carrier 60, or impregnated and encapsulated as has been previously described. If metallic, filament 76 is preferably removed from stack 58. If filament 76 is non-magnetic, it may be left in stack 58 or withdrawn.

Figure 1:
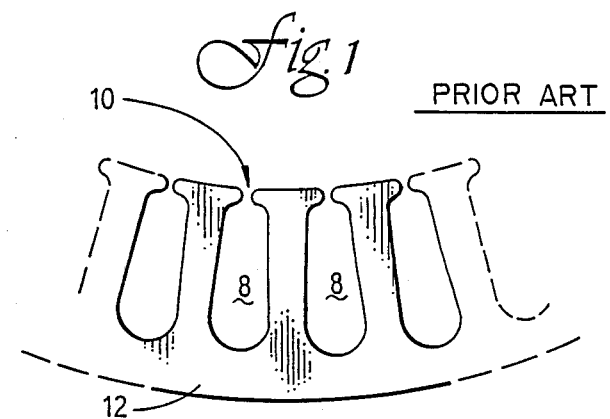
FIG. 1 is a partial elevation view of a prior art lamination having a semi-closed slot.
Figure 2:
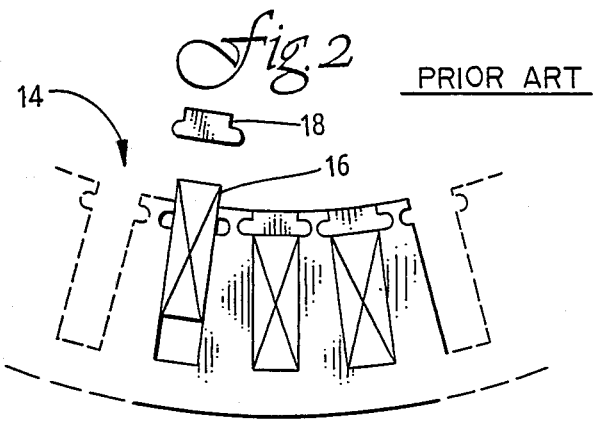
FIG. 2 is a partial elevation view of a prior art lamination having a fully open slot receiving form wound coils secured by non-magnetic top wedges.
Figure 9:
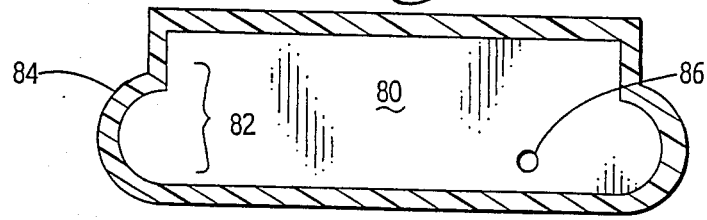
FIG. 9 shows an alternative embodiment of the magnetic top wedge of the present invention suitable for use in the stator of FIG. 2.

The invention is not to be taken as limited to all of the details thereof, as modifications and variations thereof may be made without departing from the spirit or scope of the invention. For example, and referring to FIG. 9, wedge laminations 80 may be formed to have a side configuration 82 keyed to conform to a slot opening as shown in FIG. 2. In FIG. 9, insulating layer 84 is interposed between side 82 and an adjacent side of a core lamination wall. Furthermore, the function of opening 74 may be accomplished by a hole or aperture 86 which itself is displaced from the center of gravity the cross-section of lamination 80.

Accordingly, what is claimed is:

1. A method of assembling an insulated, laminated ferromagnetic motor stator slot wedge comprising:
    (a) forming a plurality of wedge laminations of ferromagnetic material, each having a pair of non-parallel opposing sides and a keyhole-shaped opening at other than the center of gravity of the lamination cross-section;
    (b) aligning said laminations into a congruent stack by threading a plurality of said wedge laminations on a filament through said opening; and
    (c) enclosing said stack in insulating material such that said laminations thereafter remain in a congruent stack.
2. The method of claim 1 wherein the filament of step (b) is non-magnetic.
3. The method of claim 1 wherein the filament of step (b) is metallic.
4. The method of claim 3 further comprising an additional step of removing said metallic filament from said stack.
5. The method of claim 1 wherein step (c) comprises inserting said stack in a preformed channel of insulating material.
6. The method of claim 1 wherein said enclosing of step (c) further comprises surrounding said stack
7. The method of claim 1 wherein said enclosing of step c) further comprises encapsulating said stack in non-magnetic material
8. The method of claim 7 wherein said enclosing of step (c) further comprises bonding adjacent laminations together with an interlamination coating.
9. The method of claim 7 wherein said non-magnetic material comprises a plastic.
10. The method of claim 9 wherein said non-magnetic material comprises an epoxy.

* * * * *